United States Patent
Borgen

(10) Patent No.: US 8,672,302 B2
(45) Date of Patent: Mar. 18, 2014

(54) SHOCK AND VIBRATION DAMPER

(75) Inventor: Harald Borgen, Horten (NO)

(73) Assignee: Techni AS, Borre (NO)

( * ) Notice: Subject to any disclaimer, the term of this patent is extended or adjusted under 35 U.S.C. 154(b) by 397 days.

(21) Appl. No.: 12/921,571

(22) PCT Filed: Mar. 10, 2009

(86) PCT No.: PCT/NO2009/000086
§ 371 (c)(1),
(2), (4) Date: Apr. 6, 2011

(87) PCT Pub. No.: WO2009/113868
PCT Pub. Date: Sep. 17, 2009

(65) Prior Publication Data
US 2011/0180685 A1 Jul. 28, 2011

(30) Foreign Application Priority Data
Mar. 11, 2008 (NO) .................................. 20081295

(51) Int. Cl.
*F16F 7/14* (2006.01)
*F16F 3/02* (2006.01)
(52) U.S. Cl.
CPC .... *F16F 7/14* (2013.01); *F16F 3/02* (2013.01)
USPC ...................................................... 267/136
(58) Field of Classification Search
CPC .................. F16F 3/02; F16F 3/08; F16F 7/14
USPC .......... 267/136, 147–149; 248/570, 626, 628, 248/636
See application file for complete search history.

(56) References Cited

U.S. PATENT DOCUMENTS

| 4,586,689 A | * | 5/1986 | Lantero .......................... 248/570 |
| 4,783,038 A | * | 11/1988 | Gilbert et al. ................. 248/570 |
| 5,062,507 A | | 11/1991 | Roche |
| 5,149,066 A | * | 9/1992 | Snaith et al. ................... 267/136 |
| 5,482,259 A | * | 1/1996 | Loziuk ........................... 267/136 |
| 5,791,636 A | * | 8/1998 | Loziuk ........................... 267/136 |

FOREIGN PATENT DOCUMENTS

| FR | 1560072 A | 3/1969 |
| SU | 1395867 A | 5/1988 |

* cited by examiner

*Primary Examiner* — Christopher Schwartz
(74) *Attorney, Agent, or Firm* — Christian D. Abel

(57) ABSTRACT

The invention relates to a type of shock and vibration isolator which has almost identical rigidity and damping properties in any translatory direction, wherein the device is disposed between a reference object (A) which is subjected to vibrations and shocks, and a means (B) which is only to be subjected to translatory damped vibrations and shocks in all directions, where a center bar (2) and wire rope holders (3) are designed for attachment to any one of the reference objects (A) or (B), characterized in that the center bar (2) and the wire rope holders (3) are rigidly interconnected to three or more independent wire rope series (4), each of which is formed of two or more wire rope loops where the configuration of a wire rope series (4) is based on essentially as many wire rope loops with opposite geometrical angles of inclination (A1 and A2), each wire rope series forming a symmetry along a center axis relative to an unloaded neutral position for the isolator and where the three or more wire rope series (4) are symmetrically arranged about the center axis in an about-axis symmetry principle relative to the radial neutral position of an unloaded isolator, such that the two symmetry principles together give almost identical translatory properties in all directions for damping of shock and vibration between the reference objects (A) and (B).

4 Claims, 3 Drawing Sheets

SHOCK AND VIBRATION DAMPER

FIELD OF THE INVENTION

The invention relates to a type of shock and vibration isolator that has almost identical rigidity and damping properties in any translatory direction. By any translatory direction is meant that the structure of the isolator works as a suspension point corresponding to a ball that is able to rotate and absorb forces which run through the centre of the ball regardless of how the ball is rotated (the ball is symmetric about all three axis planes). The invention cannot be rotated like a ball, but has the same properties for loads in any translatory direction.

Isolators of this type are designated "omnidirectional isolator".

BACKGROUND

The main function of an isolator is to be the flexible link in a structure which is able to stop and/or damp vibration and shock loads from mechanical oscillations or shocks induced from the surroundings. The object that is to be damped is normally secured by one or more isolators, so that the total configuration has the properties that are desirable to isolate vibration and shock in the desired directions.

The background of the invention is a need for an isolator that has properties such as: low own weight, high damping, identical translatory damping properties in all axial directions, small size and long lifetime at low and high temperatures (−60 to +100° C.).

In, for example, the aircraft industry there are stringent requirements for isolators that are to damp shocks and vibration on critical components which are comprised in the basic functions of the aircraft, these being, for example, manoeuvring, navigation and engine functions. It is a particular requirement that isolators should have an own weight that is as small as possible and that isolators should function at a temperature of as low as at least −56° C. without their characteristics being essentially changed. Similarly, when it comes to heat, it is important that the isolator should function at a temperature as high as at least 100° C. (sun on hot days). These are actual requirements that must be met to comply with safety standards.

The invention is especially suitable for the mounting and installation of equipment that is to be protected from shocks and vibration in aircraft, boats and motor vehicles, but it may also have other areas of use.

Already existing isolators have good properties in one axis, for example, as taught in U.S. Pat. No. 4,783,038, or in one plane, as described in U.S. Pat. No. 5,791,636, but isolators according to the known solutions do not have the properties that are necessary if the isolator is to be able to take loads outside the specified axes/planes.

The first type of isolator to appear on the market is described in U.S. Pat. No. 4,783,038. In this isolator, the wire rope is secured in a wire rope series, the series being divided into two half series, and each of the half series having opposite inclinations such that a complete series compensates for lateral forces in the plane. A vertical load thus has stable properties in only one direction (compression) from a neutral position. This isolator does not have any additional wire rope loops that are secured at different inclinations in other directions than these two series, and therefore has completely different properties in all other directions than vertically downwards.

In U.S. Pat. No. 5,791,636, the symmetry in the plane is produced in that two loop series according to U.S. Pat. No. 4,783,038 are used that are placed diametrically 180 degrees opposite each other. This configuration will mean that identical properties will only be obtained in this plane which is parallel to the two loop series. For loads that act in directions out from this plane, the properties will be completely different.

The document also discloses that each loop series consists of two independent half series with opposite angles of inclination "a", but that these are positioned separately on their respective side.

Moreover, the document describes an isolator that is mounted at each end of a centre piece (centre bar). This construction only has symmetrical properties in the axial direction of the centre bar from a neutral position, that is to say, in connection with linear motions along the centre bar.

Unlike U.S. Pat. No. 5,791,636, the invention solves the along-axis symmetry with a continuous loop series where each side of the loop series has different angles of inclination relative to the centre axis of the isolator.

SUMMARY OF THE INVENTION

Thus, in accordance with the invention there is provided a preferred embodiment of a device for damping translatory vibration and shock in all directions, where the device is disposed between a reference object that is subjected to vibrations and shocks and a means that is only to be subjected to translatory damped vibrations and shocks in all directions, where a centre bar and wire rope holders are designed for attachment to any one of the reference objects.

The invention is characterised in that the centre bar and the wire rope holders are rigidly interconnected to three or more independent wire rope series, each of which is formed of two or more wire rope loops, where the configuration of a wire rope series is based on essentially as many wire rope loops with opposite geometrical angles of inclination along the longitudinal direction of the centre bar, each wire rope series thus forming a symmetry along the centre axis relative to an unloaded neutral position for the isolator, and where the three or more wire rope series are symmetrically arranged about the centre axis in an "about-axis symmetry" principle relative to the radial neutral position for an unloaded isolator, so that the two symmetry principles together give almost identical translatory properties in all directions for damping of shock and vibration between the reference objects.

Reference object A thus refers to the housing and wire rope holders, which are locked or screwed to the structure that generates vibrations and shocks, whilst reference object B refers to the centre bar which is locked or screwed to the object that is to be protected. These two reference objects are then joined by wire rope loops that are configured to have the desired damping properties to be able to work the subject invention.

In different embodiments, the device may be characterised in that all the wire rope series are rigidly connected between the reference objects, the reference objects being so designed that the individual wire loops are rigidly fixed in the reference objects.

In another embodiment, all the wire rope series are rigidly connected between the centre bar and the wire rope holders, which wire rope holders are fastened to a peripheral housing.

In yet another embodiment, each of the wire rope series can be rigidly connected between a central wire rope holder and peripheral wire rope holders, the central wire rope holder being designed to be fastened to a reference object A and the peripheral wire rope holders being designed to be fastened to a reference object B.

In order to obtain the desired effect with almost identical properties in all directions, the housing and the centre bar must be almost rigidly fastened to their respective separate objects so that mutual movement between the two objects is essentially based on translations and not on rotations. The invention has a design that to a certain degree makes it capable of capturing small relative rotations, but the principle is essentially based on translatory properties. These are the very same conditions that are also required in the case of corresponding "omnidirectional isolators", which are based on rubber as damping material.

The main function of an isolator is to be the flexible link in a structure that is able to stop or damp vibration and shock loads from mechanical oscillations or shocks induced from the surroundings.

The object that is to be damped is normally secured by one or more isolators, such that the total configuration has the properties that are desirable to isolate vibration and shocks in the desired directions. The difference between an "omnidirectional isolator" based on wire rope versus already existing wire rope isolators which at most give identical properties in one plane, is that the object that is to be isolated needs fewer isolators for the desired-degree of isolation to be as good. This means that the total investment and maintenance costs are substantially lower with omnidirectional isolators and that the design of the invention, which is based on a "symmetry about one axis" and an "along-axis symmetry" principle, is configured such that the total properties from both symmetry principles have the effect that all axial directions have the same deflection and damping properties.

BRIEF DESCRIPTION OF THE DRAWINGS

The present invention is further illustrated in the attached figures, wherein.

DETAILED DESCRIPTION OF THE INVENTION

Figure 1:
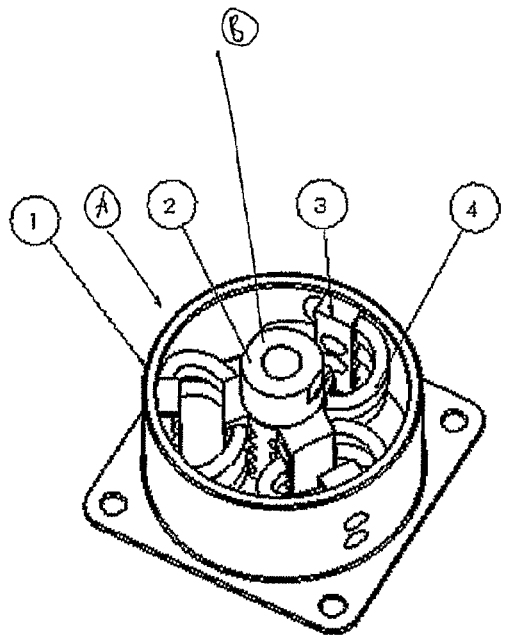
FIG. 1 is a perspective view of an embodiment of a complete isolator according to the present invention.
Figure 2:
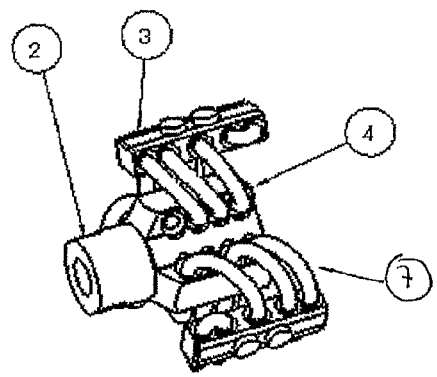
FIG. 2 is a side perspective view of the isolator in FIG. 1, where the isolator has been removed from the housing.

As shown in particular in FIG. 1, the main principle of the functioning of the isolator is based on wire rope loops 4 which are rigidly connected between a stationary and, for example, substantially circular part 1, termed "housing" 1 and a central part 2, termed "centre bar". The wire rope loops 4 are secured between housing 1 and centre bar 2 in three or more rows. The orientation and inclination of the individual half loops 4 in each wire rope row 7 are important in order to obtain the desired rigidity and damping properties at the same time and almost identical for all directions.

As shown in particular in FIG. 1, the main principle of the functioning of the isolator is based on wire rope loops 4 which are rigidly connected between a stationary and, for example, substantially circular part 1, termed "housing" 1 and a central part 2, termed "centre bar". The wire rope loops 4 are secured between housing 1 and centre bar 2 in three or more rows. The orientation and inclination of the individual half loops 4 in each wire rope row 7 are important in order to obtain the desired rigidity and damping properties at the same time and almost identical for all directions.

FIGS. 1-7 show embodiments of the invention where the "about-axis symmetry" principle as described above is reflected in the invention in that symmetrically arranged about a centre axis 8 there are three or more loop series 7 which exert a force against the centre axis 8, where the axis can also be defined as a vector. Since the invention consists of three or more loop series 7, we will always have identical force/displacement properties if a force is exerted radially against the centre axis 8 in any radial direction perpendicular to the centre axis 8.

Figure 3:
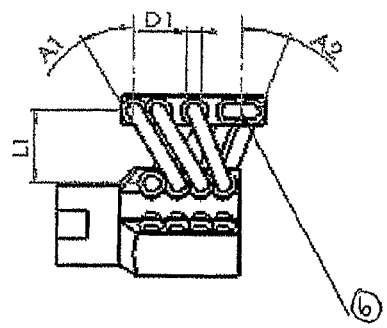
FIG. 3 is a side view of the centre bar according to FIGS. 1 and 2.
Figure 4:
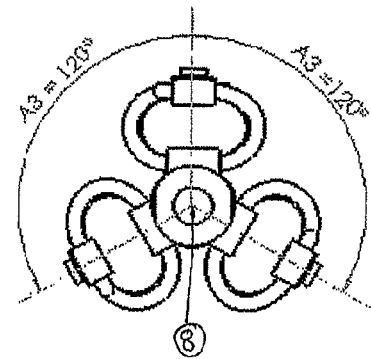
FIG. 4 is a top view of the centre bar according to FIGS. 1 and 2.
Figure 5:
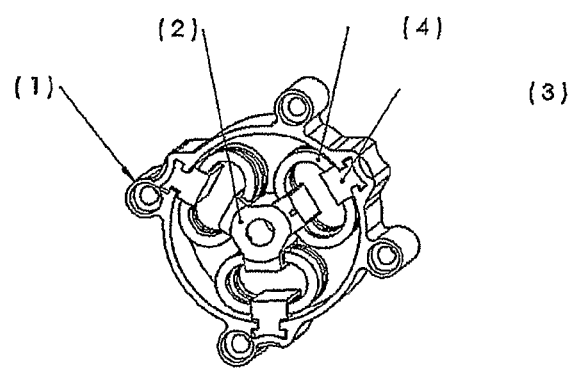
FIG. 5 shows a further embodiment of the isolator according to the present invention, where the design of the isolator housing is made possible by extrusion.

The "along-axis symmetry" principle as described above is reflected in the invention in that each loop series 7 is secured at an angle of inclination as shown in FIG. 3 by the angles A1 and A2. The design of the loop series 7 is based on there being almost as many half loops 4 with angle of inclination A1 as half loops 4 with angle of inclination A2. Each of these half loop series 7 is characterised in that the rotational direction of the wire rope for each half loop series 7 is identical as regards tension and pressure. In FIG. 3 the turning point 6 for the wire rope is also indicated where the wire changes direction. This is essential in order to allow the properties along the axis to be symmetrical. The angles of inclination A1 and A2 are not necessarily identical for all the half loops 7 on each side. These angles of inclination vary from a largest angle designated A1 for one of the sides and A2 for the other side to an angle that may be 0 degrees.

The angles are accurately adjusted with respect to rigidity and damping for along-axis symmetry and about-axis symmetry, and will have to be varied according to the wire rope diameter D1 and centre distance L1 for the wire loops as shown in FIG. 3.

The design of the loop series 7 is based on there being almost as many half loops 4 with angle of inclination A1 as half loops 4 with angle of inclination A2. If the rotational direction of the wire strands is not reversed for each of the half loops with opposite angles as described above, the angles of inclination A1 or A2 must compensate for this difference in that the angles of inclination for the individual wire rope loops 4 are adjusted so that along-axis rigidity and damping is almost the same in a positive and a negative direction.

As can be seen from FIGS. 1-7, there are almost as many half loops 4 that are secured at respective angles. For small compact isolators, the rotational direction of the strands in each of the individual half loops 4 must have opposite rotations such that the symmetry properties are obtained within a limited geometrical area where the rotational direction of the strands in the wire rope 4 is important. This is because each half loop 4 which is rigidly connected between the centre bar 2 and housing 1 has different properties for displacements in a positive or negative direction relative to the neutral position for the along-axis symmetry. In one of the directions, the wire rope 4 will become taut and rigidity will increase, whilst in the opposite direction the wire rope 4 will become slack and the rigidity will be relatively smaller. By combining almost as many half loops 4 with opposite strand rotations and inclinations in each of the axial directions, the desired symmetrical properties are obtained. The design of the invention is not based on mutual rigidity for rotation between centre bar and housing being prevented on the basis of the actual configuration of the wire rope between the two objects A and B. The translatory properties of the invention are based on rotation between reference object A and B being prevented by virtue of the configuration of the two or more omnidirectional isolators between the two objects.

Many alternative designs are possible where the form of the centre bar 2 and the housing 1 can be configured in different ways. For illustrated FIGS. 1-7, the actual locking of the wire ropes 4 to the centre bar 2 and wire rope holder 3 is effected in that the centre bar 2 and wire rope holder 3 are deformed by compression in the area where the wire rope 4 runs through respective parts. This way of fastening the wire rope 4 is a generally used method for wire rope isolators where the wire rope diameter is less than about 6 mm. For isolators where the wire rope diameter is greater than about 6 mm, it is usual to clamp the wire rope 4 in place with an overlying rectangular bar which has preformed half holes into which the wire rope is clamped together with respective parts 1 or 2 which also have preformed half holes. This is a commonly known locking method.

The design of the housing 1 and the centre bar 2 is not limited to always having to be a continuous compact unit that can be described as one isolated product. Since the design of the centre bar 2 and the housing 1 is more or less arbitrary, these units can also be incorporated/integrated into the object that is to be isolated so that the isolator may be considered as a continuous part of the object to be damped, but which has the principle of about-axis symmetry and along-axis symmetry based on the invention.

Figure 6:
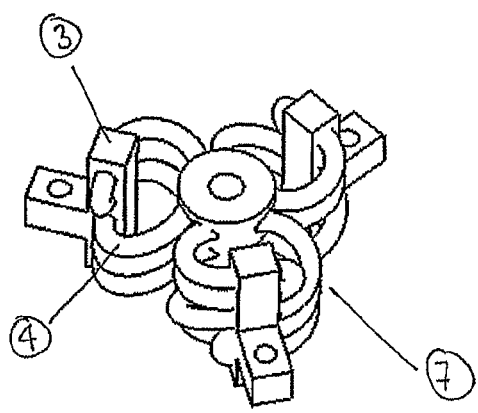
FIG. 6 shows another embodiment of the isolator according to the present invention, where the design of the invention permits mounting of peripheral wire rope fasteners directly to the reference object.

An alternative embodiment of the invention is shown in FIG. 6, where the external wire rope holders 3 are fastened directly to the object that is isolated. The isolation principle of the isolator here is identical to the invention, but the peripheral fasteners are locked in place by a random object and not the isolator itself.

Figure 7:
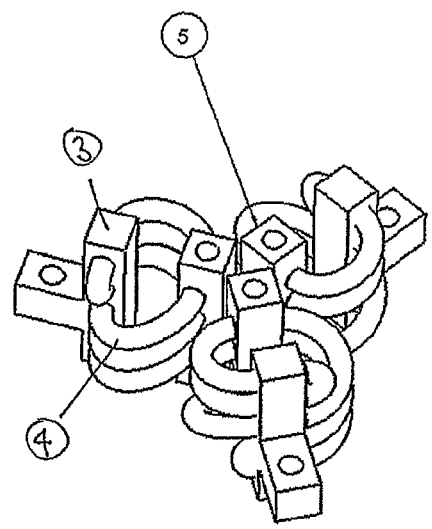
FIG. 7 shows another embodiment of the isolator according to the present invention without a housing, where the centre bar is split so that each wire rope series can be joined directly between reference objects A and B without a fixed centre bar.

FIG. 7 shows another alternative embodiment where the wire rope series 4 are mutually rotated alike about a centre axis 2, each of the wire rope series 4 being fixedly connected between a reference object A and a reference object B, where centre bar 2 can be regarded as split into as many parts as the number of wire rope series 4, but which are rigidly joined via reference object A or reference object B. Similarly, the peripheral wire rope fasteners 3 are joined via reference object A or reference object B, such that the wire rope series 4 together form a device where almost identical translatory properties for rigidity and damping are obtained in all directions.

The invention claimed is:

1. A device for damping vibration and shocks, where the device comprises a housing and a plurality of wire rope holders, which are subjected to vibrations and shocks, and at least one center bar and a plurality of wire ropes series, wherein the center bar and the wire rope holders are rigidly interconnected to three or more independent wire rope series, where each wire rope series comprises two half loop rows, each of the half loop rows further comprising a plurality of individual half loops, where the individual half loops in a first half loop row of a wire rope series are configured with opposite geometrical angles of inclination than the individual half loops in a second half loop row of the same wire rope series, each of the wire rope series further forming a symmetry along a center axis of the center bar relative to an unloaded neutral position for an isolator and where the wire rope series further form a symmetry around the center axis of the center bar relative to a radial neutral position for an unloaded isolator.

2. A device according to claim 1,
wherein all the wire rope series are rigidly connected between the housing and the center bar, where the housing and the center bar are designed such that the individual wire rope loops are rigidly fixed in the house and the center bar.

3. A device according to claim 1,
wherein all the wire rope series are rigidly connected between the center bar and the wire rope holders, which wire rope holders are fastened peripheral to the housing.

4. A device according to claim 1,
wherein each of the wire rope series is rigidly connected between a central wire rope holder and a number of peripheral wire rope holders, wherein a central wire rope holder is designed to be fastened to the center bar and the peripheral wire rope holders are designed to be fastened to the housing.

* * * * *